United States Patent Office 3,232,755
Patented Feb. 1, 1966

3,232,755
PHOTOCONDUCTIVE LAYERS FOR ELECTRO-
PHOTOGRAPHIC PURPOSES
Helmut Hoegl, Wiesbaden, Erwin Lind, Wiesbaden-
Biebrich, and Heinz Schlesinger, Wiesbaden, Germany,
assignors, by mesne assignments, to Azoplate Corpora-
tion, Murray Hill, N.J., a corporation of New Jersey
No Drawing. Filed June 13, 1960, Ser. No. 35,403
Claims priority, application Germany, July 1, 1959,
K 38,111
32 Claims. (Cl. 96—1)

Inorganic materials, such as selenium or zinc oxide, as well as various organic low molecular weight substances, such as anthracene, chrysene, and benzidine, have previously been used for electrophotographic purposes.

Photoconductive layers have now been found which are especially suited for electrophotographic usages and which consist, at least partially, of one or more polymerization products or copolymers of heterocycles having vinyl substituents, and/or substitution products thereof.

Photoconductive substances suitable for use in the present invention are polymers and copolymers of heterocycles which have vinyl substituents and which may be substituted in the ring. Suitable are, in particular, electron releasing substituents such as those listed on page 604, Table I of "Organic Chemistry," second edition, by L. F. and M. Fieser, e.g. alkyl groups, such as methyl, ethyl, propyl, butyl, isobutyl, and amyl groups; alkoxy groups, such as methoxy, ethoxy, propoxy, and butoxy groups; dialkylamino groups, such as dimethyl amino, diethylamino, dipropylamino, and dibutylamino groups; hydroxyl groups esterified with carboxylic acids, such as acetic acid, propionic acid, and butyric acid; hydroxyl and amino groups. Of these, the dialkyl amino groups are used with special advantage.

Heterocycles having vinyl substituents which are suitable for use in the present invention are, e.g.: vinyl quinolines, such as 2-vinyl-quinoline; vinyl-furanes, such as 2-vinyl-furane; vinyl benzofuranes, such as 2-vinyl benzofurane; vinyl dibenzofuranes, such as 3-vinyl dibenzofurane; vinyl alkyl-carbazoles, such as 2-vinyl-N-methyl-carbazole, 3-vinyl-N-ethylcarbazole, 2-vinyl-N-ethylcarbazole, 3-vinyl-N-methylcarbazole, 3-vinyl-N-isopropyl carbazole, 3-vinyl-N-methoxy phenyl carbazole; vinyl oxazoles, in particular vinyl-4,5-diphenyl-oxazoles, such as 2-vinyl-4,5-diphenyl-oxazole, 2-vinyl-4-(4'-dimethylaminophenyl)-5-phenyl-oxazole, 2-vinyl-4-(4'-diethylaminophenyl) - 5 - phenyl-oxazole, 2-vinyl-4-(4'-dimethylaminophenyl) - 5 - (4'-chloro-phenyl)-oxazole, 2-vinyl - 4 - (4' - dimethylaminophenyl) - 5 - (2' - chloro-phenyl) - oxazole, 2-vinyl-4-(4'-diethyl-aminophenyl)-5-(2'-chlorophenyl)-oxazole, 2-vinyl-4-(4'-dipropyl-aminophenyl)-5-(2'-chlorophenyl)-oxazole, and 2-vinyl-4-(4'-dibutylaminophenyl)-5-(2'-chloro-phenyl)-oxazole.

Suitable copolymers are those of the vinyl compounds with each other or with other compounds containing polymerizable double bonds, such as acenaphthylene and in particular aromatic vinyl compounds, e.g. styrene and methyl styrene.

The polymers of heterocyclic vinyl compounds may be prepared by known polymerization processes, e.g. by block, dispersion or suspension polymerization, using known radical-forming compounds, such as peroxide or azo compounds, as catalysts. If block polymerization is effected, the radical-forming substance, e.g. azoisobutyric acid dinitrile, is advantageously added to the molten monomeric material. After completion of the polymerization, the product obtained is advantageously purified by dissolving it in a solvent and reprecipitating it from the solution.

The process can also be effected in the presence of an inert solvent, in which case the polymerizate generally precipitates. The precipitate is separated by filtration, washed with a solvent, if necessary, and dried. The polymerizate thus obtained may be further purified by reprecipitation.

In a further advantageous method for the production of polymeric compounds, the corresponding carbinol compounds are heated with a dehydrating agent, if desired under reduced pressure, whereby polymerization occurs, simultaneously with the dehydration. The polymerization products thus obtained may be purified by reprecipitating them from solvents. When the carbinol compounds are prepared from aldehydes and alkyl halides by the method of Grignard, polymeric reaction products are usually formed in the course of the reaction.

According to the above methods, polymerization products are obtained corresponding to the following general formula

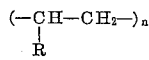

wherein

R is a heterocyclic radical, which may be substituted, and $n$ is an integer greater than 1.

Depending on the reaction conditions, such as the temperature, the solvent, and the kind and quantity of the catalyst and the dehydrating agent used, polymerizates of differing degrees of polymerization are obtained. Relatively high molecular weight compounds of this kind are in general resin-like and may be applied as photoconductive layers to suitable base materials without the addition of a binder.

The monomeric heterocyclic vinyl compounds and the monomeric carbinol compounds to be polymerized—the latter being transformed into their polymers with simultaneous dehydration—are prepared by known methods. Examples of such methods are given below in connection with the description of the preparation of the products of the present invention.

If the high polymeric reaction products described above are to be used as photoconductive layers for electrophotographic purposes, they are applied, advantageously after being dissolved in an organic solvent, onto a support, e.g. by casting, coating, or spraying, and then evaporating the solvent. The products can also be applied to the support in the form of dispersions in water or other dispersing agents. The base materials used as supports may be any that satisfy the requirements of electrophotography, e.g. metal or glass plates, paper or plates or foils made of electroconductive resins or plastics, such as polyvinyl alcohol, polyamides, and polyurethanes. Other plastics which have the required electroconductivity, such as cellulose acetate and cellulose butyrate, especially in a partially saponified form, polyesters, polycarbonates, and polyolefines, if they are covered with an electroconductive layer or if they are converted into electroconductive materials, e.g. by chemical treatment or by introduction of materials which render them electrically conductive, may also be used. Generally speaking, electroconductive supports are suitable for the purposes of the present invention. In the sense of the present invention, the term "electroconductive support" comprises materials having a specific conductivity higher than $10^{-12}$ ohm$^{-1}$, cm.$^{-1}$, preferably higher than $10^{-10}$ ohm$^{-1}$. cm.$^{-1}$.

The base material provided, as described above, with a thin, coherent layer of uniform thickness of the photoconductive materials according to the present invention is used for electrophotographically producing copies by uniformly charging the photoconductive layer in the absence of light, e.g. with a corona discharge taken from a charging device maintained at about 6000 to 7000 volts. Subsequently, the electrophotographic material is exposed to light in contact with a master, or by episcopic or diascopic projection of a master; an electrostatic image is thus obtained. This invisible image is developed by contacting it with a developer consisting of a carrier and a toner. Suitable carriers are tiny glass balls, iron powder, or tiny plastic balls.

The toner consists of a resin-carbon black mixture or a colored resin and usually has a grain size of about 1 to 100µ, preferably 5–30µ. The developers may also consist of a resin or pigment suspended in a dielectric liquid in which, if desired, resins may be dissolved. In the case of a dry development, the developed image is fixed, e.g. by heating it with an infrared radiator to a temperature of 100–170° C., preferably 120–150° C., or by treatment with solvents, e.g. trichloroethylene, carbon tetrachloride, or ethyl alcohol, or steam. Images are thus obtained which are high in contrast.

If a polarity of the electrical charge is used which is opposite to the polarity of the toner contained in the developer, images corresponding to the master characterized by good contrast effect are obtained. By changing the polarity of the corona discharge, it is also possible to obtain reversal images from the same master and with the same developer. However, it is preferred also to change from a positive master to a negative master and vice versa, when changing the polarity to obtain the best results. This is an advantage over the inorganic photoconductors such as zinc oxide or selenium, which can be charged with one polarity only to give good images.

These electrophotographic images may be transformed into printing plates. For this purpose, they are wiped over with a suitable solvent or with a developing agent, preferably an aqueous alkaline developer, rinsed with water and inked with greasy ink. Printing plates are thus obtained which may be set up in an offset printing machine and used for printing.

If transparent supports are used, the electrophotographic images can also be used as masters for the production of additional copies on any type of layers. When using translucent supports for the photoconductive layers, such as are provided by the present invention, reflex images can also be produced.

The photoconductive layers of the present invention absorb light primarily within the ultraviolet range of the spectrum. The sensitivity of the photoconductive layers can be improved by the addition of activating substances, such activators being organic compounds which, in molecular complexes of the donor-acceptor type (π-complexes, charge transfer complexes), can serve as electron acceptors. They are compounds of a high electron affinity and are acids according to the definition of Lewis. Compounds of such a nature are those containing strongly polarizing radicals or groups, such as the cyano group or nitro group; halides, such as fluorine, chlorine, bromine, and iodine; the ketone group, the ester group, an acid anhydride group or acid groups, such as carboxylic groups, or the quinone configuration. Such polarizing electron-attracting groups are described by L. F. and M. Fieser in "Organic Chemistry," second edition, 1950, page 604, Table I. Those substances are preferred, the melting point of which is above room tempearture, viz. solid substances as, due to the low vapor pressure thereof, they impart to the photoconductive layers a good storability. Moderately colored substances, such as quinones, can be used, however, it is preferred to use colorless or only slightly colored substances. The preferred maximum of absorption of the compounds is within the ultraviolet range of the spectrum, i.e. below 4500 A. Moreover, the activator materials to be used according to the present invention should be of low molecular weight, i.e. the molecular weight thereof should range between 50 and about 5000, preferably between about 100 and about 1000, since with low molecular weight activators, reproducible results, with respect to sensitivity, can be obtained. Moreover, the sensitivity is maintained constant over a long period as, contrary to the high molecular weight materials, the low molecular weight materials do not change substantially when stored. Such compounds are e.g.:

| | |
|---|---|
| 2-bromo-5-nitro-benzoic acid | o-chloro-nitrobenzene |
| 2-bromo-benzoic acid | chloro-acetophenone |
| 2-chloro-toluene-4-sulphonic acid | 2-chloro-cinnamic acid |
| chloro-maleic acid anhydride | 2-chloro-4-nitro-1-benzoic acid |
| 9-chloro-acridine | 2-chloro-5-nitro-1-benzoic acid |
| 3-chloro-6-nitro-1-aniline | 3-chloro-6-nitro-1-benzoic acid |
| 5-chloro-nitrobenzene-5-sulfochloride | phthalic acid anhydride |
| 4-chloro-3-nitro-1-benzoic acid | chloro-mucoic acid |
| 4-chloro-2-hydroxy-benzoic acid | bromo-mucoic acid |
| 4-chloro-1-phenol-3-sulfonic acid | styrene-dibromide |
| 2-chloro-3-nitro-1-toluene-5-sulfonic acid | xylene tetra-bromide |
| 4-chloro-3-nitro-benzene-phosphonic acid | $\beta,\beta,\beta$-trichloro-lactonitrile |
| dibromo-succinic acid | triphenyl-chloro-methane |
| 2,4-dichloro-benzoic acid | tetrachloro phthalic acid |
| dibromo-maleic acid anhydride | tetrabromo phthalic acid |
| 9,10-dibromo anthracene | tetraiodo phthalic acid |
| 1,5-dichloro-naphthalene | tetrachloro-phthalic acid anhydride |
| 1,8-dichloro-naphtalene | tetrabromo-phthalic acid anhydride |
| 2,4-dinitro-1-chloro naphthalene | tetraiodo-phthalic acid anhydride |
| 3,4-dichloro-nitrobenzene | tetrachloro-phthalic acid-monoethylester |
| 2,4-dichloro-benzisatin | tetrabromo-phthalic acid-monoethylester |
| 2,6-dichloro-benzaldehyde | tetraiodo-phthalic acid-monoethylester |
| hexabromo-naphthalic acid anhydride | iodoform |
| bz-1-cyano-benzanthrone | fumaric acid dinitrile |
| cyano-acetic acid | tetra-cyano-ethylene |
| 2-cyano-cinnamic acid | 1,3,5-tricyano-benzene |
| 1,5-dicyano-naphthalene | |
| 3,5-dinitro-benzoic acid | 2,4-dinitro-1-chloronaphthalene |
| 3,5-dinitro-salicylic acid | 1,4-dinitro-naphthalene |
| 2,4-dinitro-1-benzoic acid | 1,5-dinitro-naphthalene |
| 2,4-dinitro-1-toluene-6-sulfonic acid | 1,8-dinitro-naphthalene |
| 2,6-dinitro-1-phenol-4-sulfonic acid | 2-nitrobenzoic acid |
| 1,3-dinitro-benzene | 3-nitrobenzoic acid |
| 4,4′-dinitro-diphenyl | 4-nitrobenzoic acid |
| 3-nitro-4-methoxy-benzoic acid | 3-nitro-4-ethoxy-benzoic acid |
| 4-nitro-1-methyl-benzoic acid | 3-nitro-2-cresol-5-sulfonic acid |
| 6-nitro-4-methyl-1-phenol-2-sulfonic acid | 5-nitro-barbituric acid |
| 2-nitro-benzene-sulphinic acid | 4-nitro-acenaphthene |
| 3-nitro-2-hydroxy-benzoic acid | 4-nitro-benzaldehyde |
| 2-nitro-1-phenol-4-sulfonic acid | 4-nitro-phenol |
| 4-nitro-1-phenol-2-sulfonic acid | picric acid |
| 3-nitro-N-butyl-carbazole | picryl chloride |
| 4-nitro-diphenyl | 2,4,7-trinitro-fluorenone |
| tetra-nitro-fluorenone | 1,3,5-trinitro-benzene |
| 2,4,6-trinitro-anisol | |
| anthraquinone | 1-chloro-2-methyl-anthraquinone |
| anthraquinone-2-carboxylic acid | duroquinone |
| anthraquinone-2-aldehyde | 2,6-dichloro-quinone |
| anthraquinone-2-sulfonic acid-anilide | 1,5-diphenoxy-anthraquinone |
| anthraquinone-2,7-disulfonic acid | 2,7-dinitro-anthraquinone |
| anthraquinone-2,7-disulfonic acid-bis-anilide | 1,5-dichloro-anthraquinone |
| anthraquinone-2-sulfonic acid-dimethylamide | 1,4-dimethyl-anthraquinone |
| acenaphthene-quinone | 2,5-dichloro-benzoquinone |
| anthraquinone-2-sulfonic acid-methylamide | 2,3-dichloro-naphthoquinone-1,4 |
| acenaphthene-quinone-dichloride | 1,5-dichloro-anthraquinone |
| benzoquinone-1,4 | 1-methyl-4-chloro-anthraquinone |
| 1,2-benzanthraquinone | 2-methyl-anthraquinone |
| bromanil | naphthoquinone-1,2 |
| 1-chloro-4-nitro-anthraquinone | naphthoquinone-1,4 |
| chloranil | pentacene-quinone |
| 1-chloro-anthraquinone | tetracene-7,12-quinone |
| chrysene-quinone | 1,4-talv-quinone |
| thymo-quinone | 2,5,7,10-tetrachloro-pyrene-quinone |

The preferred quantity of activator which is added to the photoconductors can be easily determined by simple experiments. It varies according to the material used and usually amounts from about 0.1 to about 100 moles, preferably from about 1 to about 50 moles based on 1000 moles of photoconductive material. Mixtures of several activator materials can also be used. In addition to these materials dyestuff sensitizers may also be added.

By the addition of the activating materials, photoconductive layers can be produced which are highly light-sensitive, especially within the ultraviolet range; they are practically colorless. By means of these materials, it is also possible to strongly activate the photoconductive layers within the ultraviolet range, whereupon a high sensitivity of the photoconductive layers within the range of visible light can be obtained. This is accomplished by a very small addition of optical sensitizers, without sufficient of the dyestuff sensitizers being applied as to result in highly colored layers.

Very small quantities of the dyestuff sensitizers are capable of extending the sensitivity of the layers from the ultraviolet into the visible range of the spectrum. Additions of less than 0.01 percent of the dyestuff sensitizers are effective. In general, however, quantities of from 0.01 to 5 percent, preferably from 0.05 to 3 percent of the dyestuff sensitizers are added. Additions of larger quantities are possible, but in this case no increase in the sensitivity will generally be achieved. If the dyestuff sensitizers are used without the addition of activators, it will be advisable in general to use quantities approaching the upper limits stated above. In the presence of activators, very small quantities of dyestuff sensitizers are effective.

The following materials may be listed as examples of dyestuff sensitizers which can be used with good or very good effect. They are taken from the "Farbstofftabellen" by Schultz, 7th edition, 1931, vol. 1:

Triarylmethane dyestuffs such as Brilliant Green (No. 760, p. 314), Victoria Blue B (No. 822, p. 34), Methyl Violet (No. 783, p. 327), Crystal Violet (No. 785, p. 329), Acid Violet 6B (No. 831, p. 351); xanthene dyestuffs, namely rhodamines, such as Rhodamine B (No. 864, p. 365), Rhodamine 6G (No. 866, p. 366), Rhodamine G Extra (No. 865, p. 366), Sulphorhodamine B (No. 863, p. 364) and Fast Acid Eosin G (No. 870, p. 368), as also phthaleins such as Eosin S (No. 883, p. 375), Eosin A (No. 881, p. 374), Erythrosin (No. 886, p. 376), Phloxin (No. 890, p. 378), Bengal Rose (No. 889, p. 378), and Fluorescein (No. 880, p. 373); thiazine dyestuffs such as Methylene Blue (No. 1038, p. 449); acridine dyestuffs such as Acridine Yellow (No. 901, p. 383), Acridine Orange (No. 908, p. 387) and Trypaflavine (No. 906, p. 386); quinoline dyestuffs such as Pinacyanol (No. 924, p. 396) and Cryptocyanine (No. 927, p. 397); cyanine dyestuffs, e.g. Cyanine (No. 921, p. 394) and chlorophyll.

The photoconductive layers described above may be used in reproduction processes as well as in measuring techinques for recording purposes, e.g. photographic recorders. They are, however, also suitable for the production of other devices containing photoconductors, such as photoelectric cells, photoelectric resistors, and television pick up tubes. The photoconductive layers according to the present invention may be used in admixture with other photoconductors, with pigments, such as zinc oxide, or titanium dioxide, or if desired with resins such as ketone resins. It is, however, one of their advantages that, being high molecular weight practically colorless substances, they can be applied to the supports in the form of homogeneous transparent layers and that they require no additional binding agent or other materials to be excellent photoconductive layers.

In the examples below, preferred methods are given for the preparation of the photoconductive layers according to the present invention; the other compounds of this class may be prepared analogously. Variations in the reaction conditions, e.g. changes in the quantity of the solvent used, corresponding to a changed solubility or other quantities of a condensation agent, are within the knowledge of one skilled in the art.

Poly-2-vinyl-quinoline is prepared by heating the monomeric vinyl compound in the presence of a suitable radical forming agent, e.g. about 2 percent of azoisobutyric acid dinitrile, and purifying the polymerizate thus obtained by reprecipitation.

2-vinyl-quinoline is prepared, in accordance with the method of G. B. Bachman and D. D. Micucci as described in "Journal of the American Chemical Society," 70, page 2381 (1948), by reacting quinoline with formaldehyde, thus producing 2-(β-hydroxyethyl)-quinoline, which is, in turn, dehydrated by heating, in the presence of caustic potash, to form 2-vinyl-quinoline.

Poly-2-vinyl-furane is prepared by heating, in a sealed tube, 5 parts by weight of furyl-(2)-methylcarbinol, prepared by known methods, and 0.3 part by weight of potassium hydrogen sulfate for 24 hours to 150° C., whereupon the reaction mixture is cooled and the polymeric compound thus obtained is purified by boiling it in water.

Poly-2-vinyl-benzofurane is prepared by heating 5 parts by weight of benzofuryl-(2)-methyl-carbinol and 0.3 part by weight of potassium hydrogen sulfate for 2 hours to 150° C. at a reduced pressure of $10^{-2}$ torr. The polymerizate thus obtained is dissolved in benzene, purified by filtration over active carbon, and precipitated by means of methanol in the form of a pale resin.

Poly-3-vinyl-dibenzofurane is prepared as follows: A solution of 3-vinyl-dibenzofurane in an excess of benzene is mixed with a small quantity (about 2 percent) of boron trifluoride etherate. Subsequently, the reaction mixture is slowly heated until polymerization begins, which can be ascertained by the evolution of heat. After heat evolution has ceased, the reaction mixture is heated for another 30 minutes with reflux and then cooled, Whereupon the polymeric compound is precipitated by the addition of methanol. It may be further purified by dissolving it in benzene and then reprecipitating it by adding methanol to the solution. The monomeric 3-vinyl-dibenzofurane is obtained by the method of E. A. Kern and C. W. Wilson as described in "Chemical Engineering,' 1948, page 114, by dehydrating 3-dibenzo-furyl-methyl-carbinol with potassium hydrogen sulfate. 3-dibenzofurylmethyl-carbinol is obtained by reducing 3-acetyl-dibenzofurane, using Raney nickel as a catalyst.

Poly-2-vinyl-N-methyl-carbazole is prepared by heating together 5 parts by weight of N-methyl-carbazolyl-(2)-methyl-carbinol and 0.3 part by weight of potassium hydrogen sulfate for 2 hours to 170° C. under a reduced pressure of $10^{-2}$ torr. The polymeric polyvinyl compound thus obtained is dissolved in methylene chloride and reprecipitated by adding petroleum ether to the solution. A colorless pure product is obtained.

N-methyl-carbazolyl - (2) - methyl - carbinol (melting point 78° C.) is obtained by catalytically reducing 2-acetyl-N-methyl-carbazole under an excess hydrogen pressure of 100 atmospheres, gauge, using Raney nickel as a catalyst.

Poly-2-vinyl-N-ethyl-carbazole is prepared by analogy to the methyl compound just described. The polymeric compound is purified by dissolving it in benzene and passing the solution dropwise into methanol. This polymerizate is also colorless.

Poly-3-vinyl-N-methyl-carbazole and poly-3-vinyl-N-ethyl-carbazole are prepared analogously. The N-ethyl-carbazolyl-(3)-methyl-carbinol (melting point 75° C.) required for the preparation of poly-3-vinyl-N-ethyl-carbazole is prepared in a simple manner by reducing 3-acetyl-N-ethyl-carbazole (melting point 114–115° C.) by means of sodium borohydride. 3-acetyl-N-ethyl-carbazole is prepared in known manner by ethylating 3-acetyl-carbazole with diethyl sulfate. Alternatively, the N-ethyl-carbazolyl-(3)-methyl-carbinol may be prepared by means of a Grignard reaction. For this purpose, the known N-ethyl-carbazole-3-aldehyde is reacted in known manner with methyl magnesium iodide.

Poly-3-vinyl-N-isopropyl-carbazole is prepared by reacting 23.7 parts by weight of N-isopropyl-carbazole-3-aldehyde with the Grignard compound obtained from 2.7 parts by weight of magnesium and 17.1 parts by weight of methyl iodide, dissolved in the benzene-ether mixture. The intermediary carbinol which forms splits off water during this reaction and polymerizes. The crude product is dissolved in benzene and reprecipitated, in the form of a colorless product, by adding methanol to the benzene solution. The N-isopropyl-carbazole-3-aldehyde (melting point 114° C.) used as a starting material is obtained by formylation of N-isopropyl-carbazole by means of N-methyl-formanilide and phosphorous oxychloride. The N-isopropyl-carbazole (melting point 122° C.) is obtained by reacting potassium carbazole with isopropyl bromide.

Poly-3-vinyl-N-(4'-methoxyphenyl)-carbazole is obtained by means of a Grignard reaction from N-(4'-methoxyphenyl)-carbazole-3-aldehyde and methyl iodide. After reprecipitating it from benzene-methanol, the compound is colorless. The N-(4'-methoxyphenyl)-carbazole-3-aldehyde (melting point 133° C.) is obtained by formylation of N-(4-methoxyphenyl)-carbazole by reacting N-methyl-formanilide and phosphorous oxychloride. N-(4'-methoxyphenyl)-carbazole (melting point 153° C.) is obtained by boiling carbazole and p-bromoanisol for 24 hours in nitrobenzene to which potash and pulverized copper have been added.

Poly-2-vinyl-4,5-diphenyl-oxazole is prepared by polymerizing, according to the block polymerizing process and without the use of a catalyst, at a temperature of 90° C., the condensation product obtained, in the form of a light yellow oil, by introducing 8.4 parts by weight of benzoin and 2.2 parts by weight of acrylonitrile into 30 parts by volume of cold concentrated sulfuric acid. After two hours, the sulfuric acid solution is diluted with ice water and rendered alkaline. By extracting with benzene, a solution of the monomeric 2-vinyl-4,5-diphenyl-oxazole is obtained which is preferably purified using an aluminum oxide column. After evaporation of the benzene, an oil remains which very readily polymerizes under the influence of heat.

For purification, the polymeric resin is dissolved in dimethyl formamide and reprecipitated in the form of a colorless amphorous powder by pouring the solution drop by drop into water.

Poly - 2 - vinyl-4-(4'-dimethylaminophenyl)-5-phenyl-oxazole is obtained by polymerizing, in a block polymerization process at a temperature of 80–90° C. with the addition of a 2 percent azoisobutyric acid dinitrile as a catalyst or without a solvent, an oily product is obtained by introducing 5.1 parts by weight of 4-dimethylaminobenzoin and 1.3 parts by volume of acrylonitrile into concentrated hydrochloric acid, pouring the mixture into water, dissolving the precipitating oil in benzene, and purifying it by passing it through an alumina column. After the polymerization product has been purified, by dissolving it in dimethyl formamide and reprecipitating it by adding water to the solution, it is obtained in the form of a pale yellow powder.

Poly - 2 - vinyl 4-(4'-diethylaminophenyl)-5-phenyl-oxazole is prepared analogously by polymerizing a product obtained by condensing 5.6 parts by weight of 4-diethylaminobenzoin and 1.3 parts by volume of acrylonitrile using 30 parts by volume of concentrated sulfuric acid. The reaction product is purified by the method described in the preceding paragraph and is similarly obtained in the form of a pale yellow powder, after dissolving it in dimethyl formamide and reprecipitating it by adding the solution dropwise to water.

Poly - 2-vinyl-4-(4'-dimethylaminophenyl)-5-(4''-chlorophenyl)-oxazole is obtained by polymerizing, at temperatures of 80–90° C., with the addition of 2 percent azoisobutyric acid dinitrile and by means of the block polymerization process, a condensation product prepared by introducing 5.8 parts by weight of 4-dimethyl-amino-4'-chlorobenzoin and 1.3 parts by volume of acrylonitrile into 30 parts by volume of concentrated sulphuric acid. By introducing a dimethylformamide solution to the polymerizate into water, the polymerization product is obtained as a pale yellow powder.

Poly - 2-vinyl-4-(4'-dimethylaminophenyl)-5-(2''-chlorophenyl)-oxazole is obtained by polymerizing, according to the block polymerization process, at a temperature of 100° C. and with the addition of 2 percent azoisobutyric acid dinitrile, the monomeric compound which melts at 95° C. The monomeric compound is obtained by introducing 5.8 parts by weight of 4-dimethylamino-2'-chlorobenzoin and 1.3 parts by volume of acrylonitrile into 30 parts by volume of concentrated sulfuric acid. The reaction mixture is poured into water and the precipitated reaction product is dissolved in benzene. For purification the benzene solution is passed through an aluminum oxide column.

Poly - 2-vinyl-4-(4''-diethylaminophenyl)-5-(2''-chlorophenyl)-oxazole is prepared by polymerizing at 100° C., over a period of 24 hours and according to the block polymerization process, using 2 percent azoisobutyric acid dinitrile as a catalyst, the monomeric compound which melts at 104° C. The monomeric compound is obtained by introducing 6.4 parts by weight of 4-diethylamino-2'-chlorobenzoin and 1.3 parts by volume of acrylonitrile into 30 parts by volume of concentrated sulphuric acid. Subsequently, the reaction product is precipitated and isolated.

Poly - 2-vinyl-4-(4'-dipropylaminophenyl)-5-(2''-chlorophenyl)-oxazole is prepared by polymerizing, at a temperature of 90° C. and according to the block polymerization process, with the addition of 2 percent azoisobutyric acid dinitrile, the monomeric compound which melts at 77° C. The monomeric compound is obtained by condensing 13.8 parts by weight of 4-dipropylamino-2'-chlorobenzoin with 2.6 parts by volume of acrylonitrile in the presence of 60 parts by volume of sulfuric acid.

Poly - 2-vinyl-4-(4'-dibutylaminophenyl)-5-(2''-chlorophenyl)-oxazole is obtained by polymerizing, according to the block polymerization process and using 2 percent azoisobutyric acid dinitrile, the monomeric compound which melts at 51 °C. The monomeric compound is obtained by condensing 15 parts by weight of 4-butylamino-2'-chlorobenzoin and 2.6 parts by volume of acrylonitrile using 60 parts by volume of concentrated sulfuric acid as a condensation agent.

The invention will be further illustrated by reference to the following specific examples:

*Example 1*

For the preparation of an electrophotographic material using the photoconductive layers according to the present invention, 2 parts by weight of a polymeric 2-vinyl-4,5-diphenyl-oxazole are dissolved in 30 parts by volume of benzene and the solution is coated onto paper, the surface of which had been pretreated with polyvinylidene chloride to prevent too deep a penetration of organic solvents. After evaporation of the solvent, the polymerizate layer is provided with a negative electric charge in the absence of light by means of a corona discharge. Subsequently, an original is placed on the charged layer which is then exposed to the light of a high-pressure mercury lamp or an incandescent lamp. The electrostatic image of the original thus produced is made visible by contacting it with a developer consisting of tiny glass balls and a resin-carbon black mixture. The black-colored resin adheres to those parts of the polymerizate layer which were not struck by light during exposure and an image becomes visible which corresponds to the master used. By heating the layer, the developer powder is anchored to the support so that it can not be wiped off.

A suitable developer powder is obtained by mixing 100 parts by weight of glass balls having a grain size ranging from 350–400$\mu$ and 2.5 parts by weight of a toner of the grain size 20–50$\mu$.

The toner is prepared by melting together 30 parts by weight of polystyrene ("Polystyrol LG"), 30 parts by weight of a maleic acid resin ("Beckacite" K 105), and 3 parts by weight of carbon black ("Peerless Black" Russ 552) and grinding and sieving the melt.

Example 2

1 part by weight of a polymerizate of 2-vinyl-4-(4'-diethylaminophenyl)-5-(2'-chlorophenyl)-oxazole is dissolved in 15 parts by volume of benzene and to this solution there is added a solution of 1 part by weight of after-chlorinated polyvinyl chloride ("Rhenoflex") in 15 parts by volume of methylethylketone. Paper is mechanically coated with the solution thus obtained. The dried layer should have a thickness of about $6\mu$. After evaporation of the solvent, the photoconductive layer thus formed is given a negative charge in the absence of light by means of a corona discharge. An image is produced by the procedure described in Example 1, but fixation is performed by a treatment with trichloroethylene or with steam rather than by heating.

Example 3

A solution of two parts by weight of poly-2-vinyl-4-(4'-dipropylaminophenyl)-5-(2'-chlorophenyl) - oxazole in 30 parts by volume of chloroform is coated onto an aluminum foil and the solvent is removed. A thin, uniform, colorless layer is thus obtained which adheres firmly to the surface of the foil. By means of the electrophotographic material thus obtained, images may be produced by the method described in Example 1 and these images may be transferred in known manner onto paper, e.g. by means of an applied tension. In this case, the transfer material, e.g. a sheet of paper, is placed onto the unfixed powder image and charged with a corona discharge having the same polarity as the original charge of the now developed electrostatic image, so that the powder image is attracted by the paper and may then be fixed thereon, e.g. by heating. Copies with very good contrast are obtained.

Instead of poly-2-vinyl-4-(4'-dipropylaminophenyl)-5-(2'-chlorophenyl)-oxazole, there may be used 7.5 parts by weight of poly-2-vinyl-benzofurane, dissolved in 150 parts by volume of ethyleneglycol monomethylether.

Example 4

10 parts by weight of a copolymer consisting of 1 mole of 2 - vinyl - 4 - (4'-dimethylaminophenyl)-5-(2'-chlorophenyl)-oxazole and 6 moles of N-vinyl-carbazole in 150 parts by volume of benzene is mixed with 0.5 part by volume of a 2 percent solution in benzene of Rhodamine B extra (Schultz' "Farbstofftabellen," 7th edition, vol. 1, 1931, No. 864) and the solution is used for coating a transparent paper which had been pretreated with a polystyrene solution.

Subsequently, the solvent is evaporated. An image, produced by the method described in Example 1, on the electrophotographic layer on the transparent support described above may be used as an intermediate original for making further copies, e.g. on blueprint paper.

Example 5

To a solution containing 2 parts by weight of a copolymer of 1 mole of 2-vinyl-4-(4'-diethylaminophenyl)-5-(2'-chlorophenyl)-oxazole and 6 moles styrene in 17 parts by volume of benzene are added 1 part by volume of a 2 percent solution in benzene of Rhodamine B extra and 12 parts by volume of a 0.01 molar solution of anthraquinone in benzene. A paper base, which had been pretreated with polyvinylidene chloride to prevent the penetration of organic solvents, is mechanically coated with this solution. By means of the dyestuff-sensitized and activated electro-reproduction material thus obtained, a scum-free latent electrostatic image of a master may be produced within 2 seconds, using a 40 watt incandescent lamp at a distance of 30 cm. The images are developed in accordance with the method described in Example 1.

Equally good results are obtained if 12 parts by volume of a 0.01 molar solution of dichloroacetic acid in benzene are used for activating the mixture.

Example 6

A paper base, the surface of which had been pretreated to prevent the penetration of organic solvents, is coated with a solution of 7.5 parts by weight of poly-3-vinyl-9-ethyl-carbazole in 150 parts by volume of benzene, and then dried. Using the electroreproduction material thus obtained, images of good contrast are produced according to the method described in Example 1.

Very good images are also obtained, if, instead of poly-3-vinyl-9-ethyl-carbazole the same quantity of poly-3-vinyl-9-isopropyl-carbazole is used.

Example 7

A paper base is coated with a solution of 3.3 parts by weight of polyvinyl-2-quinoline and 3.3 parts by weight of a ketone resin ("Kunstharz EM") in 100 parts by volume of ethyleneglycol monomethylether and then dried. An electrophotographic image is prepared as described in Example 1 using, as the light source, a high-pressure mercury lamp of 150 watts at a distance of 30 cm. An exposure time of 30 seconds is sufficient.

Example 8

A paper base is coated with a solution containing 10 parts by weight of a copolymer consisting of 10 moles of vinyl-quinoline and 90 moles of styrene in 100 parts by volume of toluene and then dried. Electrophotographic images are prepared as described in Example 1, the light source, the distance and the time of exposure being as stated in Example 7.

Example 9

A solution consisting of 1 part by weight of poly-3-vinyl-N-isopropyl-carbazole dissolved in 10 parts by volume of toluene is coated onto an aluminum foil. After evaporation of the solvent, an electrophotographic image is produced by the method described in Example 1.

For conversion into a printing plate, the foil is wiped over with a developer mixture consisting of 30 parts by volume of isopropanol, 30 parts by volume of ethanol, and 10 parts by volume of 85 percent phosphoric acid. After rinsing with water and inking up with greasy ink, a printing plate is obtained from which prints can be made in an offset machine. Very long runs are obtained.

Example 10

3 parts by weight of poly-2-vinyl-4-(4'-dimethylaminophenyl)-5-(2'-chlorophenyl)-oxazole are dissolved in 30 parts by volume of toluene, and this solution is used for mechanically coating one surface of an aluminum foil. After drying the layer, an electrophotographic image is produced in the manner described in Example 1.

For the preparation of a printing plate, the image is wiped over with 30 percent isopropanol, so that the image-free areas of the foil are bared and made hydrophilic. After inking with greasy ink, the foil may be used for printing in an offset printing apparatus.

Example 11

An aluminum foil is coated with a solution of 10 parts by weight of poly-2-vinylquinoline in 100 parts by volume of benzene. After evaporation of the solvent, an electrophotographic image is produced by the method described in Example 1.

For conversion into a printing plate, the image is treated with a mixture of 60 parts by volume of ethylene glycol monoethyl ether, 20 parts by volume of 85 percent phosphoric acid, and 20 parts by volume of water. By this treatment, the image-free areas of the aluminum foil are bared and made hydrophilic. After inking with greasy ink, a printing plate is obtained from which long runs can be printed in an offset machine.

It will be obvious to those skilled in the art that many modifications may be made within the scope of the present invention without departing from the spirit thereof, and the invention includes all such modifications.

What is claimed is:

1. An electrophotographic material comprising a conductive support layer and a photoconductive insulating layer, the latter comprising at least one polymerized vinyl heterocyclic compound in which the vinyl group is linked to the heterocyclic nucleus by a C—C linkage and at least one compound selected from the group of dyestuff sensitizers and activators.

2. An electrophotographic material according to claim 1 in which the compound is further substituted by electron-releasing substituents.

3. An electrophotographic material according to claim 1 in which the vinyl heterocyclic compound is copolymerized with another polymerizable compound.

4. An electrophotographic material according to claim 2 in which the vinyl heterocyclic compound substituted by electron-releasing substituents is copolymerized with another polymerizable compound.

5. An electrophotographic material according to claim 2 in which the polymerized vinyl heterocyclic compound is poly-2-vinyl-4,5-diphenyl-oxazole.

6. An electrophotographic material according to claim 2 in which the polymerized vinyl heterocyclic compound is poly-2-vinyl-4-(4'-diethylamino-phenyl)-5-(2'-chlorophenyl)-oxazole.

7. An electrophotographic material according to claim 2 in which the polymerized vinyl heterocyclic compound is poly-2-vinyl-4-(4'-dipropylaminophenyl)-5-(2'-chlorophenyl)-oxazole.

8. An electrophotographic material according to claim 1 in which the polymerized vinyl heterocyclic compound is poly-2-vinyl-benzofurane.

9. An electrophotographic material according to claim 4 in which 2-vinyl-4-(4'-dimethyl-aminophenyl)-5-(2'-chlorophenyl)-oxazole is copolymerized with N-vinyl-carbazole.

10. An electrophotographic material according to claim 4 in which 2-vinyl-4-(4'-diethylaminophenyl)-5-(2'-chlorophenyl)-oxazole is copylymerized with styrene.

11. An electrophotographic material according to claim 2 in which the polymerized vinyl heterocyclic compound is poly-3-vinyl-9-ethyl-carbazole.

12. An electrophotographic material according to claim 2 in which the polymerized vinyl heterocyclic compound is poly-3-vinyl-9-isopropyl-carbazole.

13. An electrophotographic material according to claim 1 in which the polymerized vinyl heterocyclic compound is polyvinyl-2-quinoline.

14. An electrophotographic material according to claim 3 in which vinylquinoline is copolymerized with styrene.

15. A photographic reproduction process which comprises exposing an electrostatically charged, supported, photoconductive insulating layer to light under a master and developing the resulting image with an electroscopic material, the photoconductive layer comprising at least one polymerized vinyl heterocyclic compound in which the vinyl group is linked to the heterocyclic nucleus by a C—C linkage and at least one compound selected from the group of dyestuff sensitizers and activators.

16. A process according to claim 15 in which the compound is further substituted by electron-releasing substituents.

17. A process according to claim 15 in which the vinyl heterocyclic compound is copolymerized with another polymerizable compound.

18. A process according to claim 16 in which the vinyl heterocyclic compound substituted by electron-releasing substituents is copolymerized with another polymerizable compound.

19. A process according to claim 15 in which the photoconductive layer contains at least one compound selected from the group consisting of dyestuff sensitizers and activators.

20. A process according to claim 16 in which the photoconductive layer contains at least one compound selected from the group consisting of dyestuff sensitizers and activators.

21. A process according to claim 17 in which the photoconductive layer contains at least one compound selected from the group consisting of dyestuff sensitizers and activators.

22. A process according to claim 18 in which the photoconductive layer contains at least one compound selected from the group consisting of dyestuff sensitizers and activators.

23. A process according to claim 16 in which the compound is poly-2-vinyl-4,5-diphenyl-oxazole.

24. A process according to claim 16 in which the compound is poly-2-vinyl-4-(4'-diethylamino-phenyl)-5-(2'-chlorophenyl)-oxazole.

25. A process according to claim 16 in which the compound is poly-2-vinyl-4-(4'-dipropylaminophenyl)-5-(2'-chlorophenyl)-oxazole.

26. A process according to claim 15 in which the compound is poly-2-vinyl-benzofurane.

27. A process according to claim 18 in which 2-vinyl-4-(4'-dimethylaminophenyl)-5-(2'-chlorophenyl)-oxazole is copolymerized with N-vinyl-carbazole.

28. A process according to claim 18 in which 2-vinyl-4-(4'-dimethylaminophenyl)-5-(2'-chlorophenyl)-oxazole is copolymerized with styrene.

29. A process according to claim 16 in which the compound is poly-3-vinyl-9-ethyl-carbazole.

30. A process according to claim 16 in which the compound is poly-3-vinyl-9-isopropyl-carbazole.

31. A process according to claim 15 in which the compound is polyvinyl-2-quinoline.

32. A process according to claim 17 in which vinyl-quinoline is copolymerized with styrene.

References Cited by the Examiner

UNITED STATES PATENTS

| | | | |
|---|---|---|---|
| 2,072,465 | 3/1937 | Reppe et al. | 260—88.3 |
| 2,448,542 | 9/1948 | McQueen et al. | 260—88.3 |
| 2,544,906 | 3/1951 | Veal et al. | 260—88.3 |
| 2,606,175 | 8/1952 | Price. | |
| 2,902,365 | 9/1959 | Martin | 96—115 |
| 2,908,667 | 10/1959 | Williams | 96—115 |
| 2,956,878 | 10/1960 | Michiels et al. | |
| 3,036,915 | 5/1962 | Notley et al. | 96—115 |
| 3,037,861 | 6/1962 | Hoegl et al. | |

FOREIGN PATENTS

| | | |
|---|---|---|
| 1,188,590 | 3/1959 | France. |
| 1,191,326 | 4/1959 | France. |

NORMAN G. TORCHIN, *Primary Examiner.*

MILTON STERMAN, *Examiner.*